(12) United States Patent
Matthews (10) Patent No.: US 10,390,472 B2
(45) Date of Patent: Aug. 27, 2019

(54) DETERMINING FIELD CHARACTERISTICS USING OPTICAL RECOGNITION

(71) Applicant: AGCO Corporation, Hesston, KS (US)

(72) Inventor: Paul Ross Matthews, Bayern (DE)

(73) Assignee: AGCO Corporation, Duluth, GA (US)

( * ) Notice: Subject to any disclaimer, the term of this patent is extended or adjusted under 35 U.S.C. 154(b) by 38 days.

(21) Appl. No.: 14/804,052

(22) Filed: Jul. 20, 2015

(65) Prior Publication Data

US 2016/0029545 A1 Feb. 4, 2016

Related U.S. Application Data

(60) Provisional application No. 62/032,114, filed on Aug. 1, 2014, provisional application No. 62/093,492, filed on Dec. 18, 2014.

(51) Int. Cl.

| | |
|---|---|
| *A01B 69/04* | (2006.01) |
| *G05D 1/02* | (2006.01) |
| *G01C 21/20* | (2006.01) |
| *G06K 9/62* | (2006.01) |
| *G06T 7/00* | (2017.01) |
| *G06K 9/46* | (2006.01) |

(Continued)

(52) U.S. Cl.
CPC .......... *A01B 69/008* (2013.01); *A01C 21/007* (2013.01); *G01C 21/005* (2013.01); *G01C 21/20* (2013.01); *G05D 1/0088* (2013.01); *G05D 1/021* (2013.01); *G05D 1/0274* (2013.01); *G06K 9/00476* (2013.01); *G06K 9/4604* (2013.01); *G06K 9/52* (2013.01); *G06K 9/6215* (2013.01); *G06T 7/13* (2017.01); *G06T 7/60* (2013.01); *G05D 2201/0201* (2013.01); *G06K 9/00657* (2013.01)

(58) Field of Classification Search
CPC .... A01B 69/008; G01C 21/005; G01C 21/20; G05D 1/0274; G05D 1/0088; G05D 1/021; G05D 2201/0201; G06K 9/4604; G06K 9/6215; G06K 9/52; G06K 9/00476; G06K 9/00657; G06T 7/0085; G06T 7/60; A01C 21/007
See application file for complete search history.

(56) References Cited

U.S. PATENT DOCUMENTS 5,764,819 A 6/1998 Orr et al.
5,927,603 A * 7/1999 McNabb .............. A01G 25/092
239/63

(Continued)

FOREIGN PATENT DOCUMENTS

WO 2011/022436 A2 2/2011
WO 2013/120079 A1 8/2013

OTHER PUBLICATIONS

European Patent Office, International Search Report for related European Application No. EP15176773, dated Feb. 1, 2016.

*Primary Examiner* — Jelani A Smith
*Assistant Examiner* — Majdi Alsomiri (57) ABSTRACT

In one embodiment, a method for automated guidance comprising receiving an image of a field; identifying one or more characteristics of the field in the image; determining one or more geographic locations corresponding to the one or more characteristics of the field in the image; determining a path to be followed in the field using the one or more geographic locations; and automatically guiding the machine to follow the path.

4 Claims, 6 Drawing Sheets

(51) Int. Cl.
  *G06K 9/52*  (2006.01)
  *G06T 7/60*  (2017.01)
  *G05D 1/00*  (2006.01)
  *G06K 9/00*  (2006.01)
  *A01C 21/00*  (2006.01)
  *G01C 21/00*  (2006.01)
  *G06T 7/13*  (2017.01)

(56) References Cited

U.S. PATENT DOCUMENTS

| | | | | |
|---|---|---|---|---|
| 5,938,709 A * | 8/1999 | Hale | ............... | G01C 21/20 342/357.52 |
| 6,266,432 B1 * | 7/2001 | Wiens | ............... | G06Q 99/00 111/903 |
| 6,721,453 B1 | 4/2004 | Benson | ............... | G05D 1/0221 382/199 |
| 6,813,544 B2 * | 11/2004 | Hood | ............... | A01B 79/005 382/110 |
| 6,819,780 B2 * | 11/2004 | Benson | ............... | A01B 69/001 180/8.3 |
| 6,876,760 B1 * | 4/2005 | Vaisberg | ............... | G06K 9/0014 382/129 |
| 6,937,334 B2 * | 8/2005 | Monshouwer | ............... | G03F 9/7015 356/399 |
| 7,156,328 B2 | 1/2007 | Samaha | | |
| 7,461,798 B1 * | 12/2008 | Malsam | ............... | A01G 25/092 239/63 |
| 7,584,053 B2 * | 9/2009 | Abts | ............... | A01G 25/16 239/727 |
| 8,185,303 B1 * | 5/2012 | Wieting | ............... | A01G 25/092 239/63 |
| 8,386,129 B2 * | 2/2013 | Collins | ............... | A01B 69/008 701/41 |
| 8,412,419 B1 * | 4/2013 | Seamon | ............... | A01B 79/005 700/283 |
| 9,489,576 B2 * | 11/2016 | Johnson | ............... | G06K 9/00657 |
| 2001/0016053 A1 | 8/2001 | Dickson et al. | | |
| 2001/0036295 A1 | 11/2001 | Hendrickson et al. | | |
| 2005/0149235 A1 | 7/2005 | Seal et al. | | |
| 2006/0213167 A1 | 9/2006 | Koselka et al. | | |
| 2009/0118904 A1 * | 5/2009 | Birnie | ............... | G01C 21/00 701/41 |
| 2010/0222922 A1 | 9/2010 | Holland | | |
| 2010/0226533 A1 * | 9/2010 | Bharath | ............... | G06K 9/00268 382/103 |
| 2013/0166132 A1 * | 6/2013 | Matthews | ............... | A01B 69/008 701/23 |
| 2014/0035752 A1 | 2/2014 | Johnson | | |
| 2014/0039967 A1 | 2/2014 | Scharf et al. | | |
| 2015/0278640 A1 * | 10/2015 | Johnson | ............... | G06K 9/00657 382/110 |

* cited by examiner

DETERMINING FIELD CHARACTERISTICS USING OPTICAL RECOGNITION

CROSS REFERENCE TO RELATED APPLICATIONS

This application claims the benefit of U.S. Provisional Application Nos. 62/032,114 filed Aug. 1, 2014, and 62/093,492, filed Dec. 18, 2014, both of which are hereby incorporated by reference in their entirety.

TECHNICAL FIELD

The present disclosure is generally related to guidance systems for mobile machines.

BACKGROUND

Modern mobile machines, such as machines used in the agriculture and construction industries, often include integrated automatic guidance systems. Such automatic guidance systems may include sensors, computing devices, actuators and other components used to perform such tasks as determining a location and/or orientation of a machine, plan a path (e.g., wayline) for the machine, and/or steer the machine along the planned path. Automatically steering the machine along a path relieves the operator of the need to constantly focus on driving the machine while performing work.

Fields worked by such machines, such as agricultural fields, exist in many different sizes and shapes. Some fields may present a rectangular outer boundary, while other fields may present an arbitrarily-shaped outer boundary. Center pivot irrigation systems may define a field (or an irrigated portion of a field) according to a circular or partially circular outer boundary.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

In one embodiment, a method for automated guidance comprising receiving an image of a field; identifying one or more characteristics of the field in the image; determining one or more geographic locations corresponding to the one or more characteristics of the field in the image; determining a path to be followed in the field using the one or more geographic locations; and automatically guiding the machine to follow the path.

Detailed Description

Certain embodiments of path planning systems and methods are disclosed that use optical recognition on satellite or aerial imagery to identify and subsequently determine one or more characteristics of a field(s) in the image, such as one or more center pivot irrigation system features, among others features. In one embodiment, based upon a machine's current location, a satellite or aerial image is accessed and analyzed for whole and/or partial circular pivots. The path planning system uses optical recognition to identify one or more characteristics, such as an edge of each pivot and/or a location of a pivot arm (which is known to connect to the center) to determine a center of the pivot. Once the pivot center (e.g., geodetic coordinates of the center) has been determined, the coordinates are fed into a guidance system of the machine for use with auto-steering functionality of the machine. In some embodiments, and based on the analysis, an outside boundary can be used to automatically define a boundary for the associated pivot field for use with guidance and other operations.

Digressing briefly, in the area of auto-guidance, a guidance and positioning system (e.g., comprising a global navigation satellite system (GNSS) receiver and auto-steer functionality) aids an operator by automatically steering a vehicle along a path (e.g., wayline) and its successive paths. Farmers in certain regions use center pivot irrigation, in which an arm structure spans afield to irrigate the field, scribing a circle as the arm pivots about its center. As there exists a tower structure at the center of the pivot that fixes the arm that rotates about it, it is not possible for the machine guidance system to be placed at the center to determine where exactly the center is. To solve this problem, existing guidance systems use an operation in which the operator drives around the pivot at a given distance (either a full circle or partial circle) while the system gathers position coordinates, and uses methods such as least mean square (LMS) to determine the center of the circle to a given degree of accuracy. From here the guidance system can then use the center coordinates to guide a machine at any given radius the operator wishes. In some cases, the system is subject to accuracy errors of the GNSS system. Large portions of a pivot may be required to be driven to ensure sufficient accuracy is met to accurately determine the center. Additionally, driving around the center of a pivot can be time consuming, simply to get what are essentially two numbers (e.g., the latitude and longitude of the center). In addition, typical methods only consider the problem in two dimensions, and thus if the pivot exists on undulating terrain, the path described by the pivot is not a circle and thus the accuracy of the center can be quite poor. In some cases (e.g., usually due to undulating terrain), it may not be possible to determine the center accurately enough for the guidance system (e.g., not meeting the requirements by the system to permit guidance), and the operator needs to start the definition process from the beginning. In contrast, with certain embodiments of a path planning system, the operator may simply drive into the field and, at least in one embodiment, indicate that he or she would like to start a center pivot type of wayline. Continuing, an embodiment of the path planning system accesses satellite or other aerial imagery, identifies one or more characteristics (e.g., pivot center), determines the center coordinates of at least the pivot closest to the machine, and returns the coordinates to the guidance system, immediately enabling machine guidance along the path. If the pivot exists on undulating terrain and does not form a sufficiently round circle to find the center thereof, the identification of the pivot arm's termination point in the center of the circle-like shape still truly identifies the center.

Having summarized certain features of one or more embodiments of path planning systems, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on an agricultural machine that is guided along a center-pivot type wayline based on operations of a path planning system. However, it should be appreciated that optical recognition-based path determinations and subsequent guidance based on he determinations can be deployed for other industries and other paths (e.g., not necessarily waylines) in some embodiments, and hence are contemplated to be within the scope of the disclosure. Further, though emphasis is on path planning for center pivot wayline types, it should be appreciated that other waylines or paths may similarly benefit from certain embodiments of a path planning system, and hence are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Figure 1:
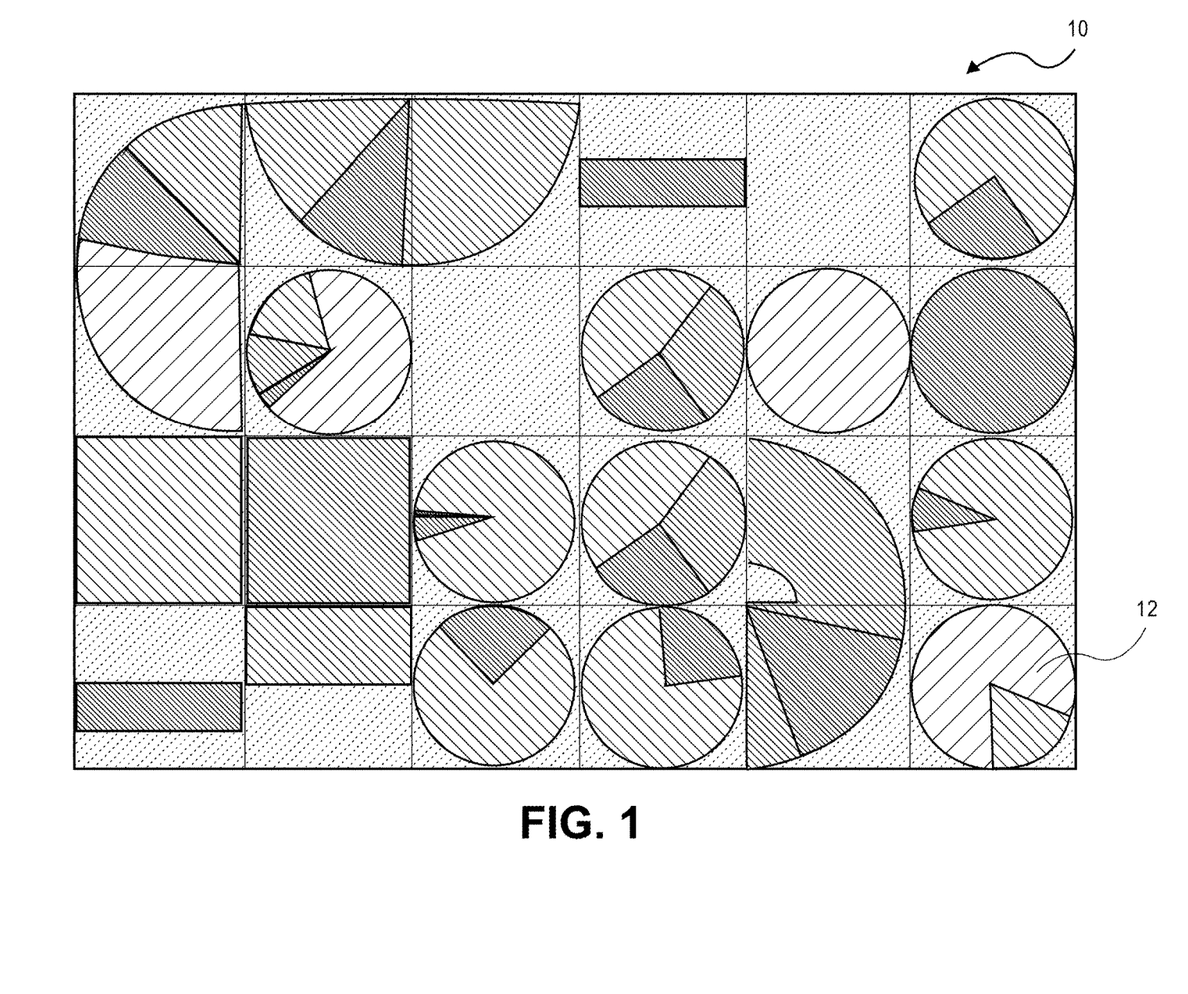
FIG. 1 is a schematic diagram that illustrates an example satellite image of a geographic area including a plurality of agricultural fields, the image accessed by an embodiment of an example path planning system.

Referring now to FIG. 1, shown is a schematic diagram that illustrates an example satellite image 10 of a geographic area accessed by an embodiment of a path planning system. In the depicted image 10, a plurality of fields 12 of the area are shown, each of which may include one or more characteristics. Such characteristics may include image-discernible features of the field, including a center pivot irrigation system (and/or evidence of its use) and/or field boundaries that enable a machine to perform precision farming. For instance, the characteristics may include pivot borders (e.g., outline of a circle or partial circle), pivot arms, pivot centers, and boundaries (e.g., field boundaries, such as rectangular or polygonal outside boundaries, and/or pivot area boundaries). In some embodiments, the image 10 of the area may be an aerial image (e.g., as captured by an airplane, helicopter, unmanned aerial vehicle ("UAV"), etc.) or, as in this example, a satellite image. The image 10 may be accessed by one embodiment of a path planning system from an Internet-based mapping or imaging service such as Google® Maps, Apple® Maps or Microsoft® Bing® Maps, among others. Such a service may also provide geographic location information (e.g., coordinates, such as geodetic coordinates) associated with the image that may be used by a computing device of the path planning system to associate one or more characteristics of one or more fields 12, such as a corner or center of the field, with a geographic location, such as a longitude and latitude. Alternatively, the image 10 may be generated by a private and/or proprietary device or service, such as an airplane, helicopter, or UAV owned by an operator of the path planning system and equipped with imaging equipment. In some embodiments, the image 10 may be accessed from a machine or device (e.g., from a storage medium, such as non-volatile memory, for instance as previously downloaded) in which a path planning system is implemented, and/or in some embodiments, via an imaging and/or mapping service or other data storage facility or device located remote from a machine with network connectivity.

The path planning system may be configured to automatically identify one or more fields 12 from the image 10 and to determine a field of interest. If the fields 12 present a circular outer boundary, for example, the path planning system may identify circular patterns (e.g., represented by pixel differences in the area) in the image 10 and associate each circular pattern with a field 12. In some embodiments, the path planning system may only associate circular patterns with a field 12 in which the associated machine is deemed closest or residing within. If the image 10 includes only a single field 12, the path planning system may automatically determine that the single field 12 is the field of interest. If the image 10 includes multiple fields 12, the path planning system may identify one or more fields 12 as fields of interest. The path planning system may present the image 10 to a user (e.g., operator in the machine or monitoring remotely) via a user interface (e.g., display screen, including immersive displays) and prompt the use to select one or more fields 12, for example. In some embodiments, the path planning system may associate one field 12 with a location of a machine (e.g., on which the machine resides or is closest to), as described above. The location of the machine may be determined by a global navigation satellite system (GNSS) receiver or other location-determining device associated with the machine.

Figure 2:
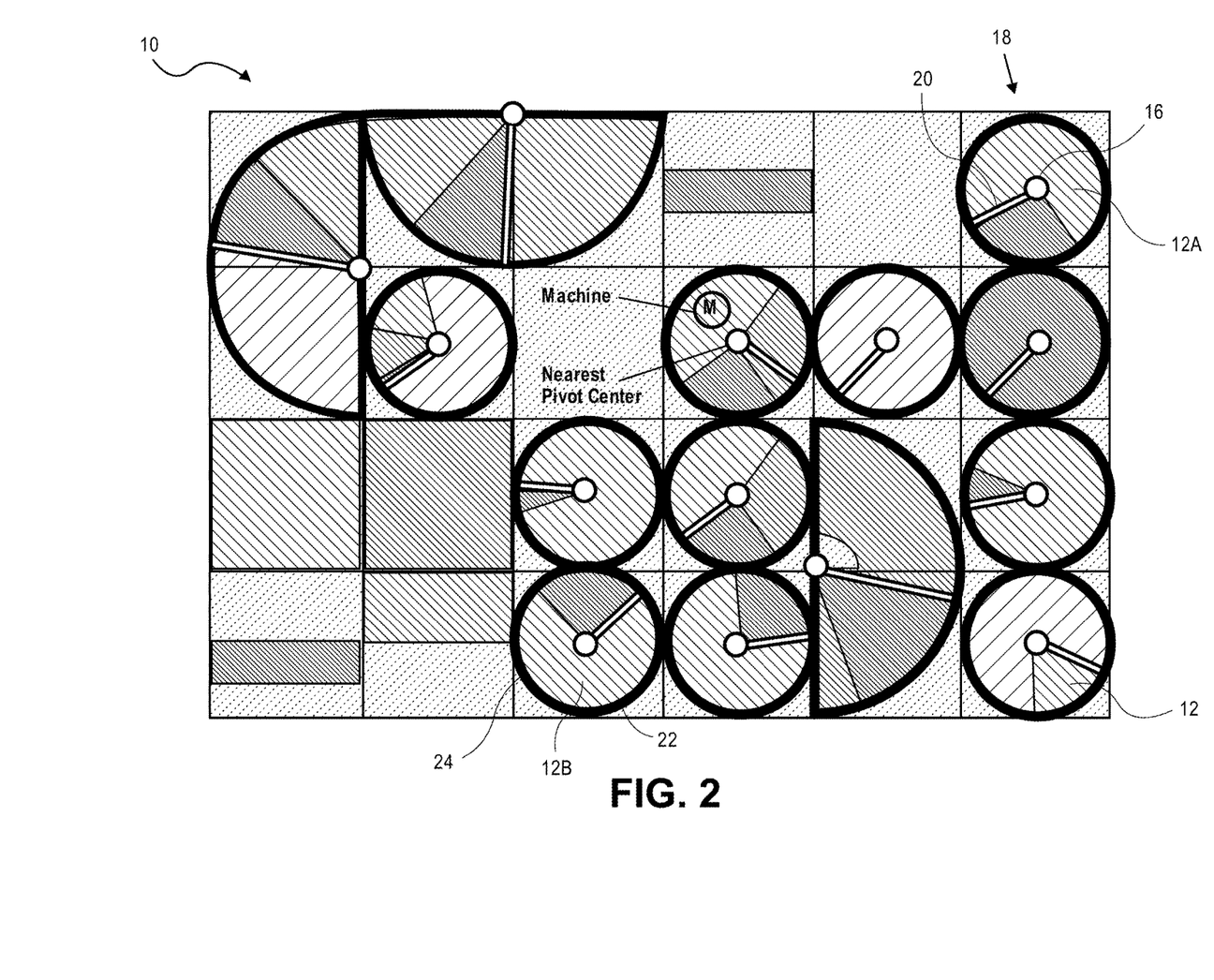
FIG. 2 is a schematic diagram that conceptually illustrates identification by an embodiment of an example path planning system of characteristics in the accessed image of FIG. 1.

Attention is now directed to FIG. 2, which conceptually illustrates identification by an embodiment of an example path planning system of characteristics in the accessed image 10 of FIG. 1. In other words, the path planning system identifies geographic characteristics of the fields 12 using the image 10. The geographic characteristics may include a center of the field, a boundary of the field, or both. Identifying a center of the field may be done, for example, by identifying a geometric center of a boundary defining the field in the image, or by detecting the location of a center of a center-pivot irrigation system in the field. For instance, and referring to FIG. 2, detecting a center 16 of the center-pivot irrigation system 18 may involve the path planning system identifying an arm structure (hereinafter, arm) 20 of the center-pivot irrigation system 18 and locating an end of the arm corresponding to the center 16 of the field 12A. Identifying a boundary of a field 12B may include identifying a perimeter 22 of the field 12B presenting a fully-circular shape 24, as well as identifying the shape of a boundary of a field that is only partially circular. For instance, only a portion of a field may be planted and irrigated, such as one-half or three-fourths of a field. A circular field may have a different radius from one year to another as the length of the pivot arm of an irrigation system is adjusted. The path planning system may identify more than one circular outer boundary and present multiple potential boundaries to a user via a user interface and prompt the user to select one of the boundaries. Also, the machine (denoted "M" in FIG. 2) may also have coordinates that are used by the path planning system in analyzing the image. For instance, the machine (or graphic representation thereof) is situated in the image in known manner relative to certain fields based on coordinates determined by a position determination device located on or associated with the machine.

Certain embodiments of a path planning system may use an optical recognition module operable to implement one or more image processing techniques known in the art to identify fields and characteristics of the fields from images of the fields. By way of example, one embodiment of a path planning system may be configured to compare image pixel characteristics to identify image features. A field typically presents different visual characteristics than the area immediately adjacent the field, such that the image pixels corresponding to the field may have different image pixel characteristics (e.g., color, brightness, etc.) than the image pixels corresponding to the area immediately adjacent the field. The path planning system may identify patterns of pixels by comparing pixels across an image. In some embodiments, the path planning system may use these and/or other known image processing techniques, such as Hough transforms to identify fields and/or characteristics.

If a center pivot irrigation system is located on undulating (e.g., hilly or uneven) terrain, a plan view of the field (e.g., from satellite or aerial images) may not present a perfectly round boundary. Some embodiments of path planning systems may use a best-fit circular pattern to define the boundary, or may identify the location of the stationary center portion of the irrigation system.

Note that the peripheral portions of a field may be planted with other types of crops or otherwise used in a different manner than a circular portion of a field. It may be desirable to use automatic guidance when traversing or working the peripheral portions of the field as well. In this situation it can be helpful to identify the center point or boundary of the circular area, as well as the other edges of the peripheral portion, to generate guidance paths.

The path planning system associates the one or more characteristics of the field with geographic locations. This function may be done using geographic information (e.g., coordinates, such as geodetic coordinates) associated with the original image, such as information or data (e.g., metadata) indicating the geographic location of all or a portion (e.g., corner) of the image. With that information, the system may associate any portion of the image with specific geographic coordinates. It may be desirable, for example, to determine the geographic location of a center of a circular field, the geographic location of the boundary of a circular field, or both. That information may be used by an automatic guidance system to generate automatic guidance paths (e.g., successive, substantially concentric waylines for the pivots, among other waylines) for a mobile machine working or traversing the field, such as a tractor tilling or seeding the field or a combine harvester harvesting a crop in the field.

Figure 3:
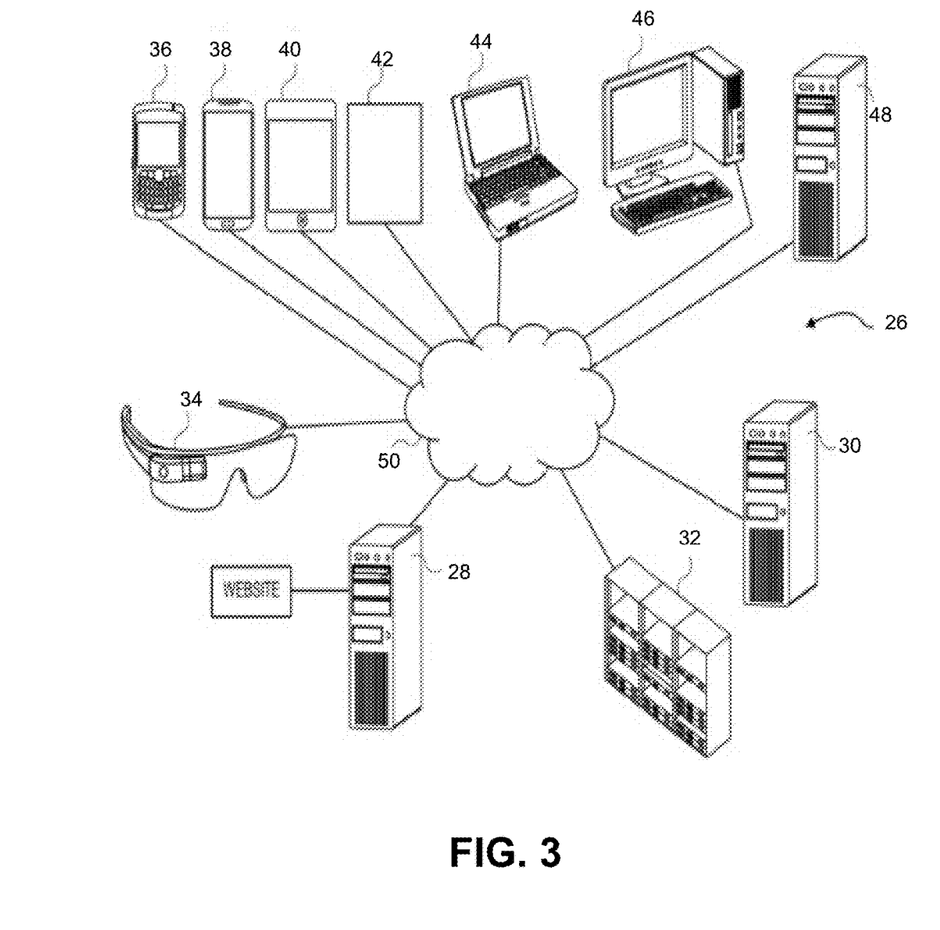
FIG. 3 is a schematic diagram that illustrates an example network environment in which an embodiment of an example path planning system may be implemented.

Having described certain features of a path planning system, attention is now directed to FIG. 3, which illustrates an example network environment in which an embodiment of an example path planning system may be implemented. In the depicted example, an example computer network 26 that may be used to implement an embodiment of a path planning system is shown. One having ordinary skill in the art should appreciate in the context of the present disclosure that the example computer network 26 depicted in FIG. 3 is merely illustrative, and that other networks with like functionality may be used in some embodiments. In one embodiment, one or more of the functions of the path planning system may be implemented with a computer program or programs that operate in conjunction with computer and communications equipment broadly referred to by the computer network 26 in FIG. 3. The example computer network 26 may include one or more host computers or systems 28, 30, 32 (hereinafter referred to simply as "host computers") and a plurality of electronic or computing devices 34, 36, 38, 40, 42, 44, 46, 48 that may access the host computers via a communications network 50. The host computers 28, 30, 32 may serve as repositories for data and programs (e.g., executable code) used to implement certain functions of the path planning system as described in more detail below. The host computers 28, 30, 32 may be any computing and/or data storage devices such as network or server computers and may be connected to a firewall to prevent tampering with information stored on, or accessible by, the computers. One of the host computers, such as host computer 28, may be a device that operates or hosts a website accessible by at least some of the devices 34-48. The host computer 28 may include conventional web hosting operating software and an Internet connection, and may be assigned a Uniform Resource Locator (URL) and corresponding domain name so that the website hosted thereon can be accessed via the Internet in a conventional manner. One or more of the host computers 28, 30, 32 may host and support a database or other data structure for storing Global Navigation Satellite System (GNSS) information, as explained below. The database may be accessible, for example, via the website operated by the host computer 28. Although three (3) host computers 28, 30, 32 are described and illustrated herein, certain embodiments of the path planning system may use any combination of host computers and/or other computers or equipment. For example, the computer-implemented features and services described herein may be divided between the host computers 28, 30, 32 or may all be implemented with only one of the host computers. Furthermore, the functionality of the host computers 28, 30, 32 may be distributed amongst many different computers in a cloud computing environment, including the other devices 34-48 in some embodiments.

The electronic devices 34-48 may include various types of devices that can access the host computers 28, 30, 32 via the communications network 50. By way of example, the electronic devices 34-48 may include one or more laptop, personal or network computers 44-48 as well as one or more smart phones, tablet computing devices or other handheld, wearable and/or personal computing devices 34-40. The devices 34-48 may include one or more devices or systems 42 embedded in, or otherwise associated with, a machine wherein the device or system 42 enables the machine, an operator of the machine, or both to access one or more of the host computers 28, 30, 32. Each of the electronic devices 34-48 may include or be able to access a web browser and a conventional Internet connection such as a wired or wireless data connection. As explained below, the device 42 may be associated with a position determining system or device on a mobile machine and may be operable to communicate with one or more of the host computers 28, 30 or 32 to receive information necessary for the position determining system or device to connect with or otherwise access a GNSS data source.

The communications network 50 preferably is, or includes, the Internet, but may also include other communications networks such as a local area network, a wide area network, a wireless network, or an intranet. For instance, the network 50 may comprise one or more networks, including a wireless network (e.g., cellular, WiFi, Wide Area Network, Local Area Network, radio frequency, terrestrial, satellite, etc.) and a wired network (e.g., POTS, cable, etc.), as should be appreciated by one having ordinary skill in the art. For example, the electronic devices 34-48 may wirelessly communicate with a computer or hub in a facility via a local area network (e.g., a Wi-Fi network), which in turn communicates with one or more of the host computers 28, 30, 32 via the Internet or other communication network. Other components and/or facilities known in the art and which may be used in some embodiments, such as cellular towers, DSLAMs, ISP facilities, etc., are omitted here for brevity.

Figure 4A:
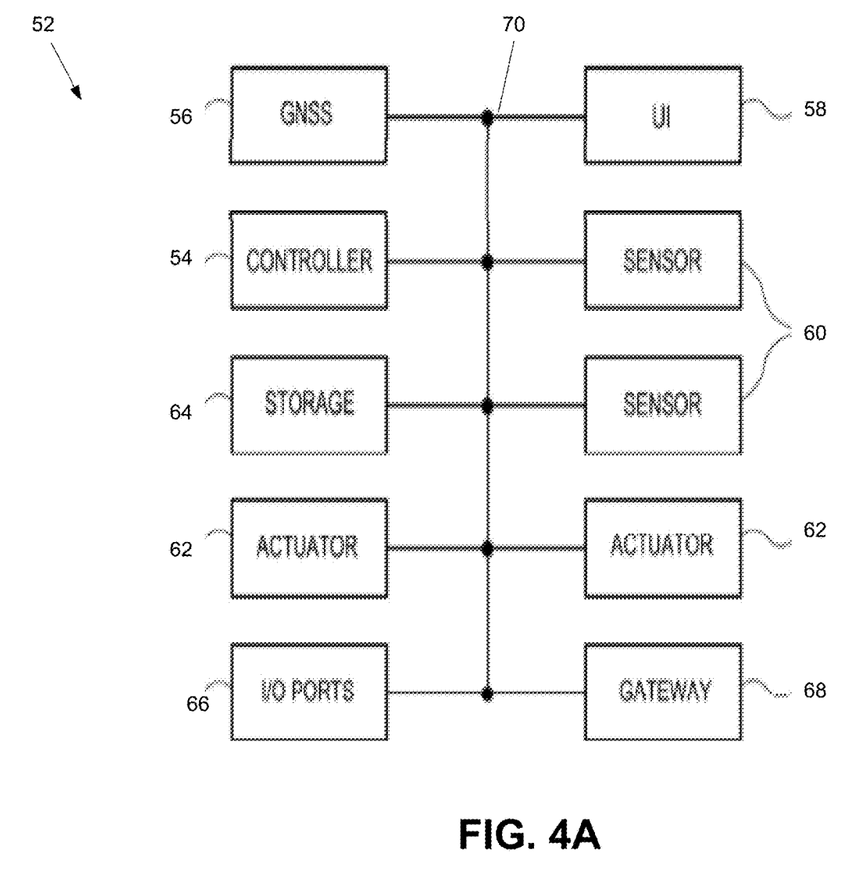
FIG. 4A is a block diagram that illustrates an embodiment of an example electronics system used to implement an embodiment of a path planning system.

One or more computer programs implementing certain functions of the path planning system may be stored in or on a non-transitory computer-readable media residing on or accessible by the computer network 26. The one or more computer programs (e.g., software, including firmware) preferably comprise ordered listings of executable instructions for implementing logical functions in the host computers 28, 30, 32 and/or the devices 34-48. The one or more computer programs can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions FIG. 4A is a block diagram that illustrates an embodiment of an example electronics system 52 used to implement an embodiment of a path planning system. Certain aspects of the path planning system can be implemented by or with the assistance of the electronic system 52, such as a control and communications system associated with a mobile machine. More specifically, aspects of the path planning system may be implemented by or with the assistance of the electronic system 52 of a mobile machine used in the agriculture and/or construction industries. Such machines may include tractors, harvesters, graders or scrapers, among others. Various components of the electronic system 52 are illustrated in FIG. 4A, and may include, for example, an automated guidance system configured to drive the associated machine without operator input. The electronic system 52 broadly includes one or more computing devices or controllers (e.g., electronic control unit) 54, a position determining device 56 (e.g., GNSS receiver), a user interface (UI) 58, one or more sensors 60, one or more actuators 62, one or more storage components 64, one or more input/out ports 66, and a gateway 68, all coupled to each other via one or more data busses 70. Note that the depicted quantities are for illustration, and that in some embodiments, a different quantity of components may be used.

The position determining device 56 may comprise a global navigation satellite system (GNSS) receiver, such as a device configured to receive signals from one or more positioning systems. As should be appreciated by one having ordinary skill in the art, such positioning systems may include satellites for one or more of the United States' global positioning system (GPS) and/or the Russian GLONASS system, among others. The position determining device 56 is further configured to determine a location of an associated machine using the received signals.

The user interface 58 includes components for receiving instructions or other input from a user and may include buttons, switches, dials, microphones, touch-screens, peripheral devices, as well as components for presenting information or data to users, such as display screens, light-mitting diodes, audio speakers and so forth. The user interface 58 may include a touchscreen display capable of presenting visual representations of information or data and receiving instructions or input from the user via a single display surface.

The sensors 60 may be associated with any of various components or functions of an associated machine including, for example, various elements of the drive system, including the engine, transmission(s), and hydraulic and electrical systems.

The actuators 62 are configured and arranged to drive certain functions of the machine including, for example, the drive system (e.g., steering and/or speed control) when an automated guidance function is engaged. The actuators 62 may take virtually any form known to those having ordinary skill in the art, and are generally configured to receive control signals or instructions from the controller 54 (or other component of the electronics system 52) and to generate a mechanical movement or action in response to the control signals or instructions. By way of example, the sensors 60 and actuators 62 may be used in automated steering of a machine wherein the sensors 60 detect a current position or state of steered wheels or tracks and the actuators 62 drive steering action or operation of the wheels or tracks. In one embodiment, the actuators 62 comprise at least a portion of the drive system for the machine.

The controller 54 may include one or more integrated circuits programmed or configured to implement one or more control functions of certain embodiments of a path planning system. By way of example the controller 54 may be a digital controller and may include one or more general purpose microprocessors or microcontrollers, programmable logic devices, or application specific integrated circuits. The controller 54 may include multiple computing components placed in various different locations on the machine. The controller 54 may also include one or more discrete and/or analog circuit components operating in conjunction with the one or more integrated circuits or computing components. Furthermore, the controller 54 may include or have access to one or more memory elements operable to store executable instructions, data, or both.

The storage device 64 stores data and preferably includes a non-transitory, non-volatile storage medium such as optic, magnetic or solid state technology.

The gateway 68 may comprise one or more devices, such as a radio modem, cellular modem, or a combination of both for enabling wireless (e.g., radio frequency or RF) communications with a remote computer, computer network or system.

The data bus 70 may comprise a complex of wiring (e.g., twisted pairs of wires), and logically operate according to a controller area network (CAN). In some embodiments, the data bus may conform to the ISO 11783 (also referred to as "ISOBUS") standard, among other industry and/or proprietary communication specification or standards. In some embodiments, the data bus 70 may comprise a wired and/or wireless medium.

It will be appreciated that, for simplicity, certain elements and components of the electronics system 52 have been omitted from the present discussion and from the drawing of FIG. 4A. For instance, a power source or power connector is also associated with the electronics system 52, for example, but is conventional in nature and, therefore, is not discussed herein.

In some embodiments, all of the components of the electronics system 52 are contained on or in a host machine. The path planning system is not so limited, however, and in some embodiments, one or more of the components of the electronics system 52 may be external to the machine. In some embodiment, for example, some of the components of the electronics system 52 are contained on or in the machine while other components of the electronics system 52 are contained on or in an implement associated with the machine. In such an embodiment, the components associated with the machine and the components associated with the implement may communicate via wired or wireless communications according to a local area network such as, for example, a controller area network. In some embodiments, the controller 54 (or functionality therein) may reside externally (e.g., remotely) to the machine, or its functionality distributed both locally and remotely.

Figure 4B:
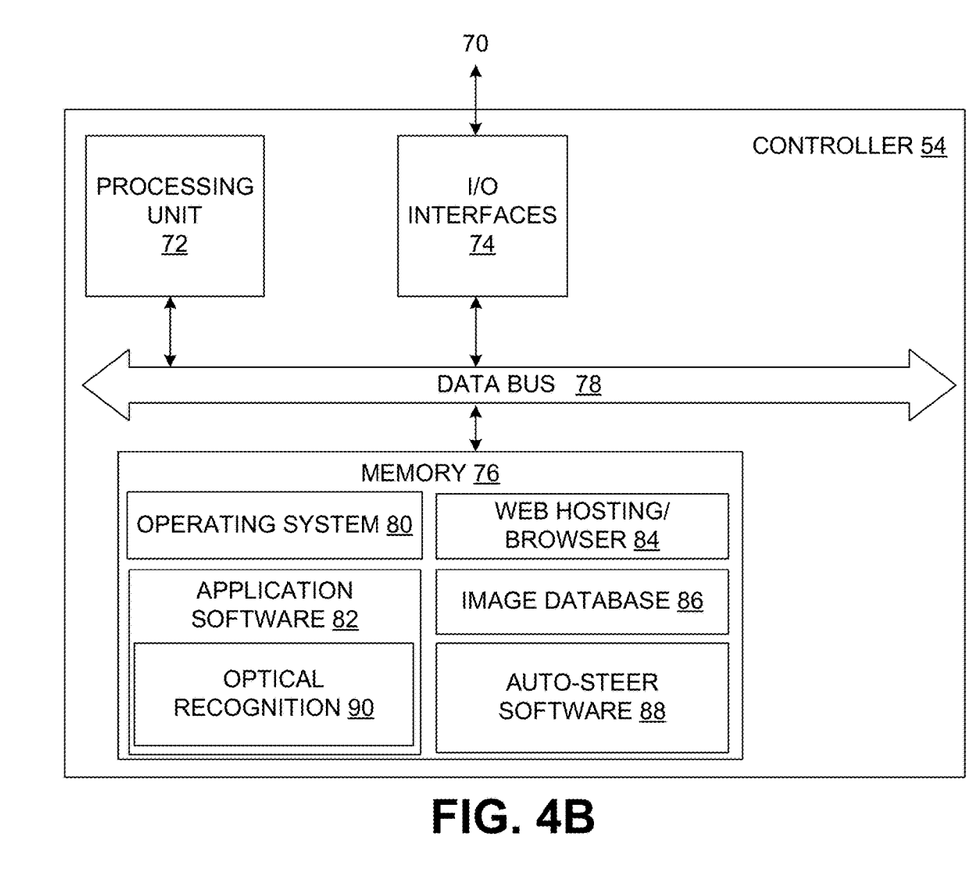
FIG. 4B is a block diagram that illustrates an embodiment of an example controller of FIG. 4A.

With continued reference to FIG. 4A, attention is directed to FIG. 4B, which illustrates an embodiment of the example controller 54 of FIG. 4A. In some embodiments, one or more functions of the controller 54 may be implemented by one or more of devices 28-48 depicted in FIG. 3. One or more embodiments of the path planning system are configured to identify one or more characteristics of a field(s) using an image of the field(s) and to associate one or more geographic locations with the one or more characteristics. The path planning system may use the one or more geographic locations to determine automated guidance paths for a machine working or traversing the field. The one or more characteristics of the field may be determined by one or more computing devices located remotely from the machine, such as one or more of the computing devices 28, 30, 32 illustrated in FIG. 3, or may be determined by one or more computing devices located on the machine, such as the computing device or controller 54 illustrated in FIG. 4A. Reference may be made herein to functions performed by "the computing device" or "the system" with the understanding that such functions may be performed by any one of the computing devices described above, or by a combination of the devices. One having ordinary skill in the art should appreciate in the context of the present disclosure that the example controller 54 is merely illustrative, and that some embodiments of the controller 54 may comprise fewer or additional components, and/or some of the functionality associated with the various components depicted in FIG. 4B may be combined, or further distributed among additional modules, in some embodiments. As noted above, it should be appreciated that one or more functionality of the controller 54 may reside in a machine (e.g., tractor, combine harvester, etc.), at a ground station, at a system or device proximal to a producer (e.g., at a facility, such as farm or office or wherever the producer is located) or remote from a producer (e.g., at a service provider facility, etc.), or with functionality distributed among two or more of these locations/devices. In FIG. 4B, the controller 54 is depicted in this example as a computer system, but all or a portion of the controller functionality may be embodied in a programmable logic controller (PLC), field programmable gate array (FPGA), application specific integrated circuit (ASIC), among other devices. As is known, the functionality of certain embodiments of the path planning system, when carried out in an ASIC or FPGA, is designed into the ASIC or FPGA according to a hardware description language (e.g., Verilog, VHDL, etc.). For embodiments using an FPGA, separate logic blocks (e.g., combinational logic or sub-portions thereof (e.g., simple logic gates, such as AND, OR gates)) may be used for separate or combined algorithmic steps of a path planning method. Programming of a PLC to perform one or more functionality of the path planning system may be achieved using any of a variety of known mechanisms, such as via application software on a personal computer and communication with the PLC over a suitable connection (e.g., Ethernet, cabling according to RS-232, RS-485, etc.) to enter or edit ladder-type logic as is known, or via a programming board interface for storage of the program into memory (e.g., EEPROM, etc.). It should be appreciated that certain well-known components of computer systems are omitted here to avoid obfuscating relevant features of the controller 54. In one embodiment, the controller 54 comprises one or more processors, such as processor 72, input/output (I/O) interface(s) 74, and a storage medium such as memory 76, all coupled to one or more internal data busses, such as data bus 78.

The memory 76 may include any one or a combination of volatile memory elements (e.g., random-access memory RAM, such as DRAM, and SRAM, etc.) and nonvolatile memory elements (e.g., ROM, hard drive, tape, CDROM, etc.). The memory 76 may store a native operating system, one or more native applications, emulation systems, or emulated applications for any of a variety of operating systems and/or emulated hardware platforms, emulated operating systems, etc. In the embodiment depicted in FIG. 4B, the memory 76 comprises an operating system 80 and one or more software modules, such as application software 82, browser or web-hosting software 84 (depending on the role of the controller 54), an image data structure (e.g., image database (DB)) 86, and auto-steer software 88. In one embodiment, the application software 82 comprises an optical recognition module 90, which carries out characteristics identification of an accessed image corresponding to an imaged field or fields, and geographical location determinations. The geographical location determinations (e.g., coordinates) may be provided by the application software 82 to the auto-steer software 88. It should be appreciated that in some embodiments, additional or fewer software modules (e.g., combined functionality) may be deployed in the memory 76 or additional memory. In some embodiments, a separate storage device may be coupled to the data bus 78, such as a persistent memory (e.g., optical, magnetic, and/or semiconductor memory and associated drives), and/or the storage 64 (FIG. 4A) may be used. Such a storage device may be a removable device, such as a memory stick or disc.

In one embodiment, the executable code of the application software 82 and the auto-steer software 88 is executed by the processor 72 to carry out the functionality of the path planning system. Note that in some embodiments, the application software 82 may be a sub-module of the auto-steer software 88, or vice versa. In one embodiment, the auto-steer software 88 receives input corresponding to a wayline type to be implemented for the machine. For instance, an operator may drive the machine onto a field and select a center pivot wayline type option presented on a screen (or invoke verbally). In some embodiments, the auto-steer software 88 may receive information corresponding to detection of a field boundary (e.g., via the comparison of boundary coordinates stored in memory 76 or accessed remotely) and the machine coordinates via the position determining device 56 (FIG. 4A). Based on the comparison indicating that the machine is within the boundary, the auto-steer software 88 may select a center pivot wayline type automatically (e.g., based on a past history or designation of the field as the location of a center pivot irrigation field). In one embodiment, control passes to the application software 82. In one embodiment, the application software 82 receives the current machine coordinates (e.g., from the position determining device 56) and, in conjunction with the web-browsing software 84, communicates those coordinates in a request (via the gateway 68, FIG. 4A) to a remote device (e.g., devices 28, 30, 32, FIG. 3) for satellite or aerial images corresponding to those machine coordinates. Responsively, the remote device communicates the satellite or aerial images back to the application software 82. In some embodiments, the images may be stored locally, such as in the image database 86, which the application software 82 can access without performing a remote link-up. The satellite or aerial images may include an area consisting of a single field in which the machine currently resides or an area comprising a plurality of fields within a defined range (e.g., user defined or predetermined) of the machine. The image is analyzed by the optical recognition module 90, which identifies characteristics in the image corresponding to all or a portion of the area, such as full and partial pivots, pivot arms, and/or their centers. If the pivot is not whole (i.e., half or quarter circle) the wayline representing the pivot can be clipped so that it more accurately represents he situation. The optical recognition module 90 may implement pixel-pixel comparisons within the image, a Hough transform, and/or other known image processing techniques. Metadata associated with the image, such as geographical locations (e.g., coordinates, such as longitude and latitude) of the identified characteristics, are extracted or associated by the optical recognition module 90. In one embodiment, the optical recognition module 90 returns to the auto-steer software 88 coordinates of the center of the closest pivot to the machine, which then loads them into a wayline algorithm for operation. In some embodiments, the application software 82 stores the pivot center coordinates in non-volatile storage (e.g., in memory 76 or storage 64 (FIG. 4A)) for faster recall on a future visit to the field. The application software 82 optionally creates a field boundary from the pivot outline for use with guidance and other functions, as explained previously.

Note that the aforementioned process of an embodiment of a path planning system is based on the electronic system 52 implemented entirely in a host. As noted above, some embodiments may implement all or a portion of the functionality of the application software 82 and/or auto-steer software 88 remotely.

Execution of the application software 82 and the auto-steer software 88 may be implemented by the processor 72 under the management and/or control of the operating system 80. For instance, as is known, the source statements that embody the method steps or algorithms of the application software 82 and the auto-steer software 88 may be translated by one or more compilers of the operating system 80 to assembly language and then further translated to a corresponding machine code that the processor 72 executes to achieve the functionality of the path planning system. Variations of this execution process are known, depending on the programming language of the software. For instance, if Java-based, the compiled output may comprise bytecode that may be run on any computer system platform for which a Java virtual machine or bytecode interpreter is provided to convert the bytecode into instructions that can be executed by the processor 72. Also, register transfer language (or other hardware description language) may be used to translate source code to assembly language, which the one or more operating system compilers translate to executable machine code. The processor 72 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 54.

The I/O interfaces 74 provide one or more interfaces to the data bus or busses 70 (FIG. 4A) to enable input to (or output from) the position determining device 56 (FIG. 4A), and/or input to (or output from) the actuators 62, the sensors 60, the user interface 58, and/or the gateway 68.

When certain embodiments of the controller 54 are implemented at least in part with software (including firmware), as depicted in FIG. 4B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the controller 54 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
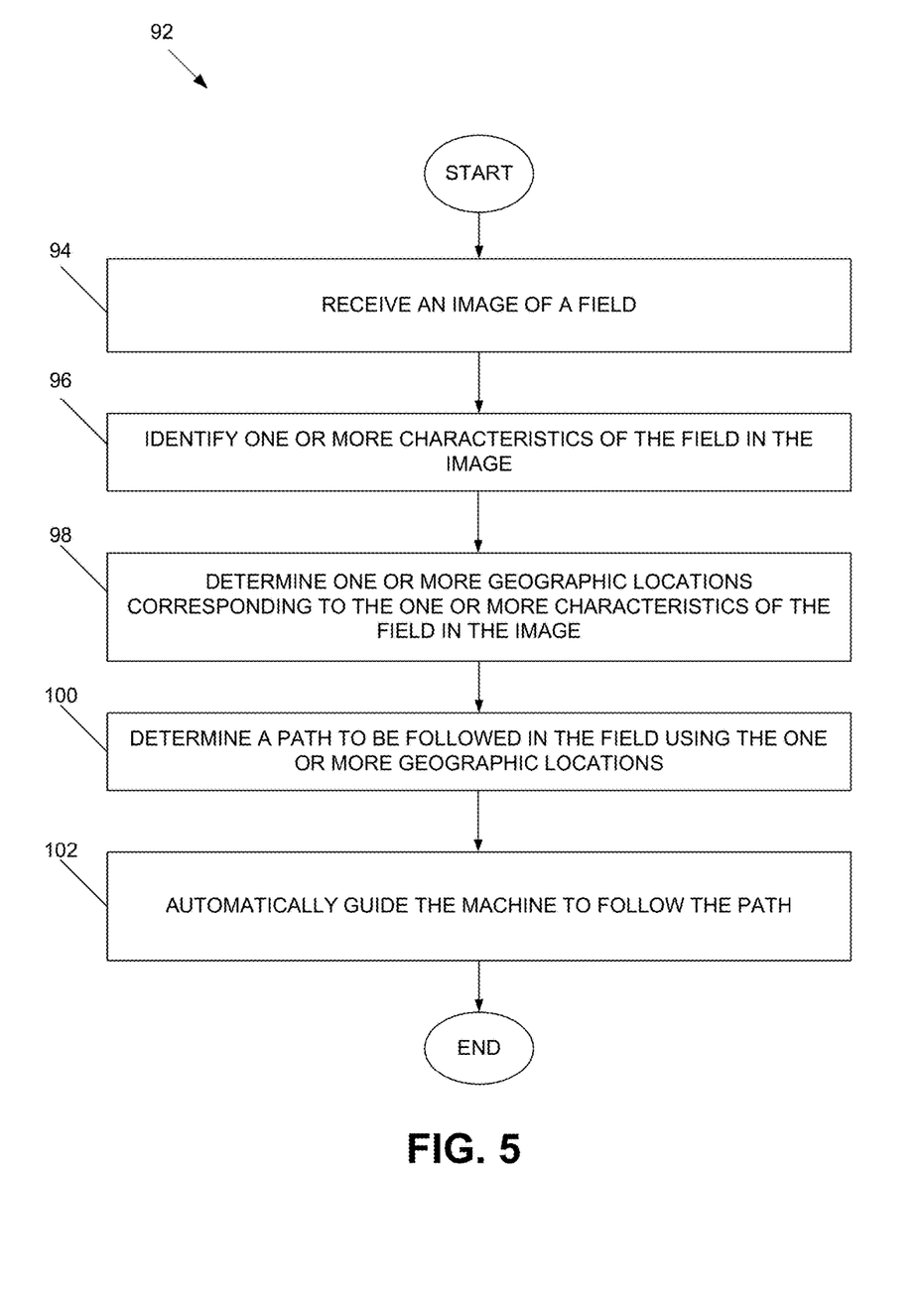
FIG. 5 is a flow diagram that illustrates an embodiment of an example path planning method.

Having described certain embodiments of path planning systems, it should be appreciated within the context of the present disclosure that one embodiment of a path planning method, denoted as method 92 as illustrated in FIG. 5, comprises receiving an image of a field (94); identifying one or more characteristics of the field in the image (96); determining one or more geographic locations corresponding to the one or more characteristics of the field in the image (98); determining a path to be followed in the field using the one or more geographic locations (100); and automatically guiding the machine to follow the path (102).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:
1. A system, comprising:
a machine comprising a drive system;
a position determining device configured to detect a geographic location of the machine; and
one or more computing devices configured to:
- access an aerial or satellite image of one or more fields;
- detect from pixel differences in the image a field boundary of one of the one or more fields;
- identify a center of a field corresponding to the field boundary by identifying a geometric center of the field boundary;
- determine coordinates for the identified center of the field;
- determine a machine path by defining multiple concentric circles of the machine path centered at the coordinates; and
- cause the drive system to automatically navigate the machine according to the machine path.

2. The system as set forth in claim 1, wherein the one or more computing devices are further configured to
- determine a location of the machine;
- determine one or more geographic locations corresponding to the one or more fields in the image;
- identify one field among the one or more fields in the image that corresponds to the location of the machine; and
- determine one of the one or more geographic locations that corresponds to the identified one field.

3. The system as set forth in claim 1, wherein the image comprises pixel differences representing the field that indicate a fully-circular outline or a partially-circular outline.

4. The system of claim 1, further comprising a user interface, wherein the one or more computing devices are configured to determine the machine path based on receiving user input corresponding to selection of a center pivot wayline option among a plurality of wayline type options.

* * * * *